United States Patent
Ariga

(10) Patent No.: US 8,200,767 B2
(45) Date of Patent: Jun. 12, 2012

(54) MICROSCOPE IMAGE TAKING SYSTEM

(75) Inventor: Naohiro Ariga, Tokyo (JP)

(73) Assignee: Olympus Corporation, Tokyo (JP)

( * ) Notice: Subject to any disclaimer, the term of this patent is extended or adjusted under 35 U.S.C. 154(b) by 208 days.

(21) Appl. No.: 12/411,595

(22) Filed: Mar. 26, 2009

(65) Prior Publication Data

US 2009/0248821 A1 Oct. 1, 2009

(30) Foreign Application Priority Data

Mar. 31, 2008 (JP) ................................. 2008-090523

(51) Int. Cl.
*G06F 15/16* (2006.01)
(52) U.S. Cl. ...................................................... 709/206
(58) Field of Classification Search .................. 709/206; 348/45, 65, 79–80, 207.99, 207.1, 207.11, 348/211.99, 211.1
See application file for complete search history.

(56) References Cited

U.S. PATENT DOCUMENTS

| | | | | |
|---|---|---|---|---|
| 5,724,127 | A * | 3/1998 | Csipkes et al. | 356/73.1 |
| 6,005,964 | A * | 12/1999 | Reid et al. | 382/133 |
| 6,847,729 | B1 * | 1/2005 | Clinch et al. | 382/128 |
| 7,292,251 | B1 * | 11/2007 | Gu et al. | 345/555 |
| 2002/0058862 | A1 * | 5/2002 | Furnas et al. | 600/300 |
| 2003/0025599 | A1 * | 2/2003 | Monroe | 340/531 |
| 2003/0184730 | A1 | 10/2003 | Price | |
| 2006/0204236 | A1 * | 9/2006 | Sasaki et al. | 396/265 |
| 2007/0172100 | A1 * | 7/2007 | Lefebvre | 382/128 |
| 2007/0252986 | A1 * | 11/2007 | Sandstrom | 356/319 |
| 2007/0288974 | A1 * | 12/2007 | Creamer et al. | 725/105 |
| 2009/0046954 | A1 * | 2/2009 | Ishii | 382/312 |
| 2009/0093046 | A1 | 4/2009 | Kiyota | |

FOREIGN PATENT DOCUMENTS

| | | |
|---|---|---|
| EP | 1 950 282 A1 | 7/2008 |
| JP | 10-186238 A | 7/1998 |
| JP | 2007-129971 A | 5/2007 |
| WO | WO 01/26541 A1 | 4/2001 |

OTHER PUBLICATIONS

Extended European Search Report dated Jul. 15, 2009 (7 pages), issued in counterpart European Application Serial No. 09004456.1.

* cited by examiner

*Primary Examiner* — Ryan Jakovac
(74) *Attorney, Agent, or Firm* — Holtz, Holtz, Goodman & Chick, PC

(57) ABSTRACT

A camera takes an observed image of a sample acquired by a microscope. A disk device stores image data representing the observed image taken by the camera. A CPU generates e-mail including the image data and information indicating the settings of the microscope or the camera during taking the observed image represented by the image data using as a destination an e-mail address entered in advance. A communication control device transmits the e-mail to a communication network.

7 Claims, 12 Drawing Sheets

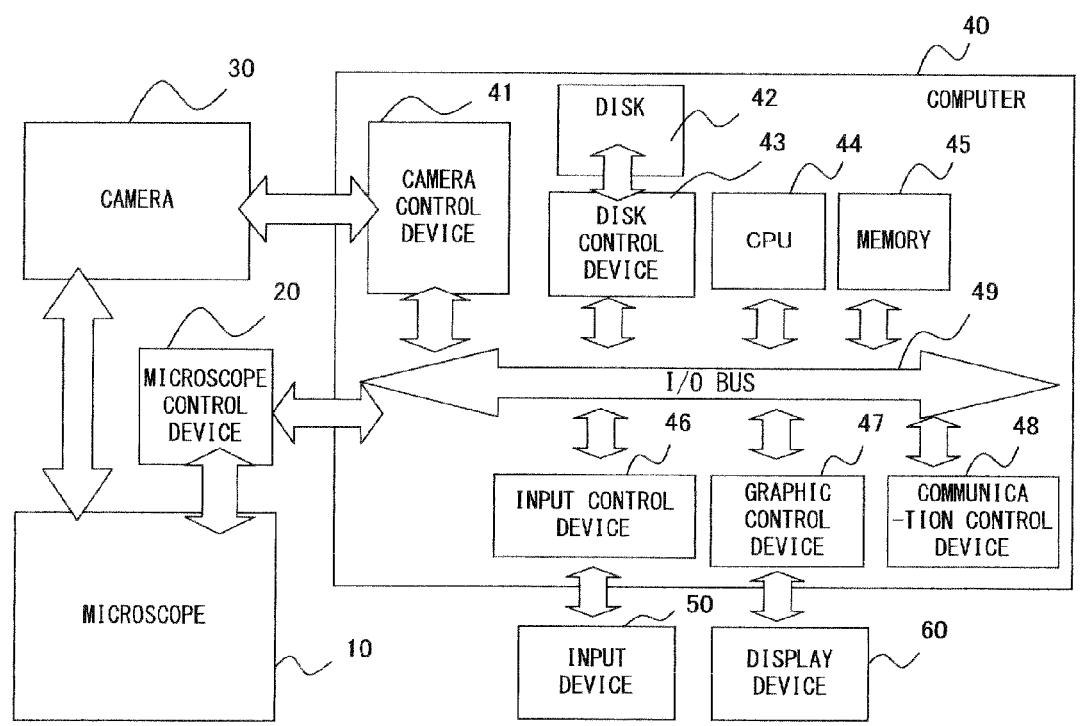
F I G. 1

| ID | User Name | Address |
|---|---|---|
| 1 | User Name1 | Address1 |
| 2 | User Name2 | Address2 |
| 3 | User Name3 | Address3 |
| 4 | User Name4 | Address4 |

FIG. 5

| CAMERA | | |
|---|---|---|
| | EXPOSING TIME | EXPOSING TIME1 |
| | Gain | Gain1 |
| | IMAGE SIZE | IMAGE SIZE1 |
| MICROSCOPE | | |
| | OBJECT LENS | OBJECT LENS1 |
| | CUBE | CUBE1 |
| | POSITION | X1,Y1,Z1 |
| | CONDENSER | CONDENSER1 |
| | LAMP | LAMP1 |
| | FILTER | FILTER1 |

FIG. 6A

| TAKING INTERVAL | hh1:mm1:ss1: |
|---|---|
| NUMBER OF TAKEN IMAGES | NUMBER OF TAKEN IMAGES1 |

FIG. 6B

| TRANSMISSION INTERVAL | hh1:mm1:ss1: |
|---|---|
| TRANSMITTING USER ID | ID1 |
| | ID2 |
| | ID3 |
| | ID4 |

FIG. 7

| DESTINATION IN EMERGENCY | ID |
|---|---|
| | ID1 |
| | ID2 |
| | ID3 |

FIG. 8

MICROSCOPE IMAGE TAKING SYSTEM

CROSS REFERENCE TO RELATED APPLICATIONS

This application claims benefit of Japanese Application No. 2008-090523, filed Mar. 31, 2008, the contents of which are incorporated by this reference.

BACKGROUND OF THE INVENTION

1. Field of the Invention

The present invention relates to the technology of a microscope, and more specifically to the technology of a remote operation of a microscope.

2. Description of the Related Art

A microscope image taking system has been proposed to perform a remote operation from a terminal on a microscope and a camera upon access from the terminal to a control device of test equipment (microscope and camera) over a communication network. For example, the Japanese Patent Application Publication No. 10-186238 discloses the microscope image taking system. In the system, the remotely operated microscope on which a pathological sample to be observed is arranged is operated by a remote operation device connected through a communication network.

In addition, for example, the Japanese Patent Application Publication No. 2007-129971 discloses a cultivation device for cultivating a sample of a cultivation plate. Upon detection of an abnormality caused by a change in an environment state surrounding the cultivation plate, a fault of the cultivation device, etc., the cultivation device transmits mail for notifying an external computer of the occurrence of the abnormality.

In the conventional microscope image taking system, while a terminal is accessing the system, a communication between the terminal and the system is established, for which a communication process is continuously performed by a control device. In this state, when the process load of the control device becomes heavy for the control process for a test equipment, there is little room for the communication process. If there is no room, an appropriate answer to an instruction from the terminal is not made, thereby disabling the remote operation of the test equipment to be performed by the terminal, or stopping an operation of the entire system. Furthermore, there can be a problem of security that can allow the third party to control the system, etc.

SUMMARY OF THE INVENTION

The system according to an aspect of the present invention takes a microscope image, and includes: a camera for taking an observed image of a sample obtained by a microscope; a record unit for recording image data representing the observed image taken by the camera; an e-nail generation unit for generating e-mail containing the image data and information about the settings of the microscope or the camera during taking the observed image represented by the image data using an e-mail address registered in advance as a destination; and a communication unit for transmitting the e-mail to a communication network.

The method according to another aspect of the present invention transmits a microscope image, and includes: recording, on a record unit, image data representing an observed image taken by a camera for taking the observed image of a sample obtained by a microscope; generating e-mail containing the image data and information about the settings of the microscope or the camera during taking the observed image represented by the image data using an e-mail address registered in advance as a destination; and transmitting the e-mail to a communication network.

A computer-readable record medium according to a further aspect of the present invention stores a program used to direct a computer to perform a process of transmitting a microscope image, and the program includes the processes of: recording, on a record unit, image data representing an observed image taken by a camera for taking the observed image of a sample obtained by a microscope; generating e-mail containing the image data and information about the settings of the microscope or the camera during taking the observed image represented by the image data using an e-mail address registered in advance as a destination; and transmitting the e-mail to a communication network.

BRIEF DESCRIPTION OF THE DRAWINGS

The present invention will be more apparent from the following detailed description when the accompanying drawings are referenced.

FIG. 1 illustrates the configuration of the microscope image taking system for embodying the present invention;

FIG. 5 illustrates an example of an address entry screen;

FIG. 6A illustrates an example of a GUT screen for setting entry of a microscope and a camera;

FIG. 6B illustrates an example of a GUI screen for setting entry of time-lapse photography;

FIG. 7 illustrates an example of a GUT screen for setting a transmission interval of e-mail;

FIG. 8 illustrates an example of a destination of e-mail in an emergency;

DESCRIPTION OF THE PREFERRED EMBODIMENTS

Figure 2:
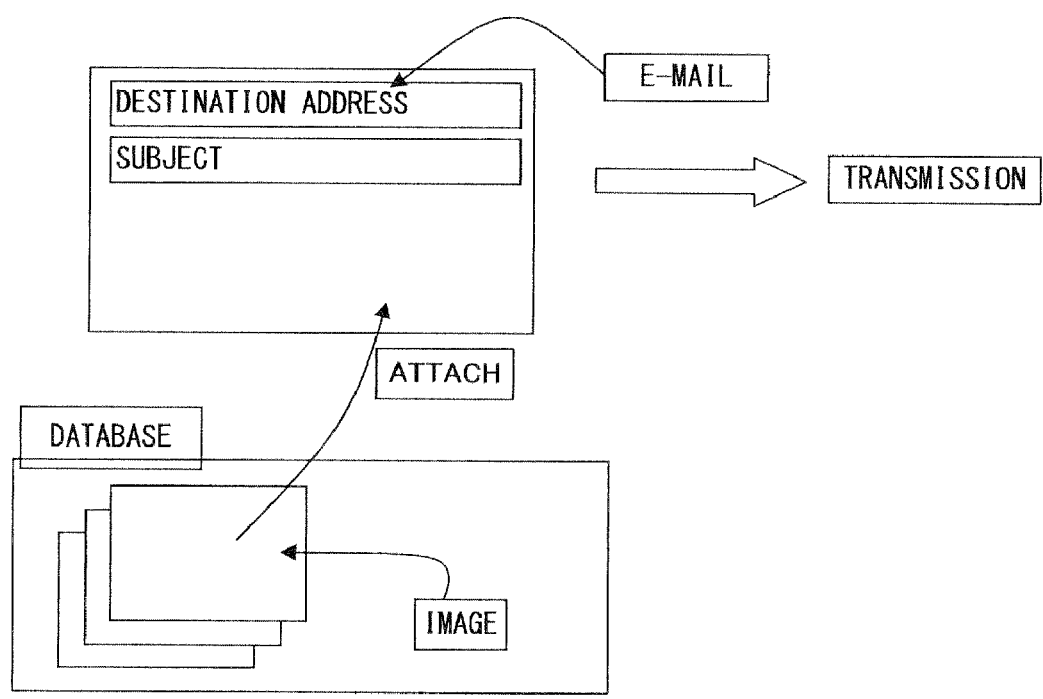
FIG. 2 is an explanatory view (1) of the outline of the operation of the microscope image taking system illustrated in FIG. 1.

The embodiments of the present invention are described below with reference to the attached drawings.

First, the configuration illustrated in FIG. 1 is described. FIG. 1 illustrates the configuration of the microscope image taking system for embodying the present invention.

As illustrated in FIG. 1, the microscope image taking system is configured by providing a microscope 10, a microscope control device 20, a camera 30, a computer 40, an input device 50, and a display device 60.

The microscope 10 includes various electro-optical members such as an electric revolver, an electric filter, an electric mirror unit cassette, an electric stage, an electric shutter, an electric prism, an electric cube turret, an electric bottom port, an electric condenser, illumination, etc.

The microscope control device 20 controls the settings of each electro-optical member provided for the microscope 10 at an instruction of the computer 40, obtains the information about the settings of each electro-optical member from the microscope 10, and notifies the computer 40 of the obtained information.

The camera 30 is connected to the microscope 10, and transmits the image data representing the image of the observed image to the computer 40 by taking the observed image of a sample obtained by the microscope 10.

The computer 40 is provided with a camera control device 41, a disk 42, a disk control device 43, a CPU 44, memory 45, an input control device 46, a graphic control device 47, a communication control device 48, and a bus 49.

The camera control device 41 controls the settings of various taking operation conditions of the taking operation of the camera 30 at an instruction of the CPU 44. Furthermore, the camera control device 41 obtains the image data transmitted from the camera 30 and the information about taking operation conditions set on the camera 30 at an instruction of the CPU 44. The taking operation conditions can be, for example, the size of an image, an exposing time, the ISO (International Standardization Organization) sensitivity, a gain, the performance of binning (pixel mixing), a contrast, a white balance, a black balance, an interval of taking time, the number of taken images, taking time, etc.

The disk 42 is an information record medium such as a hard disk device etc. The disk 42 records image data of a sample image taken by the camera 30, and various types of information including the property information (information about the settings of the electro-optical member of the microscope 10 and information about the taking operation conditions of the camera 30), etc. during taking of the sample image. The disk 42 further records a control program executed by the CPU 44. The disk control device 43 controls recording and reading data for the disk 42 at an instruction of the CPU 44.

The CPU (central processing unit) 44 controls the entire operation of the microscope image taking system illustrated in FIG. 1 by reading and executing the control program recorded on the disk 42.

The memory 45 is semiconductor memory and provided with ROM (Read Only Memory) and RAM (Random Access Memory). The ROM stores a basic program for performing basic control on each component of the computer 40. The CPU 44 first reads and executes the control program when power supply is started to the computer 40, thereby enabling each component of the computer 40 to be controlled. On the other hand, the RAM is used as working memory when the CPU 44 executes the control program, and as temporary storage of the image data of a sample image taken by the camera 30.

The input control device 46 acquires the input information obtained by input device 50 by controlling the input device 50. The input device 50 is an operator, such as a mouse device, a keyboard device, or a hand switch, operated by a user of the microscope image taking system illustrated in FIG. 1, and acquires input information from the user associated with the operation.

The graphic control device 47 controls a display device 60 to allow the display device 60 to display an observed image represented by image data and various types of information at an instruction from the CPU 44. A display device 62 can be, for example, a liquid crystal display.

The communication control device 48 is an interface device for connecting the microscope image taking system to the communication network not illustrated in the attached drawings, and communicates various types of data with a terminal not illustrated in the attached drawings at an instruction from the CPU 44 over the communication network.

The camera control device 41, the disk control device 43, the CPU 44, the memory 45, the input control device 46, the graphic control device 47, and the communication control device 48 are interconnected via the bus 49. Therefore, each of the components can communicate various types of data with one another under the management of the CPU 44.

Described next is the outline of the operation of the microscope image taking system.

In this system, the camera 30 intermittently takes an observed image of a sample acquired by the microscope 10 at predetermined time intervals, and records an obtained image on the image database generated on the disk 42, that is, performs so-called time-lapse photography. Then, as illustrated in FIG. 2, the system generates e-mail addressed to a predetermined terminal with an image data file attached about a time-lapse photo image accumulated in the image database, and transmits the mail to the communication network. Therefore, a user of the terminal receives the e-mail and opens the image data file attached to the mail, thereby browsing the time-lapse photo image at a physically remote location from the microscope image taking system.

In addition, when the system detects an abnormality in the operation of the synchronization with itself, it generates e-mail about the information addressed to a predetermined terminal, and transmits the e-mail to the communication network. Therefore, a user of the terminal can recognize the abnormality of the system by receiving the e-mail even in a physically remote location from the system.

Figure 3:
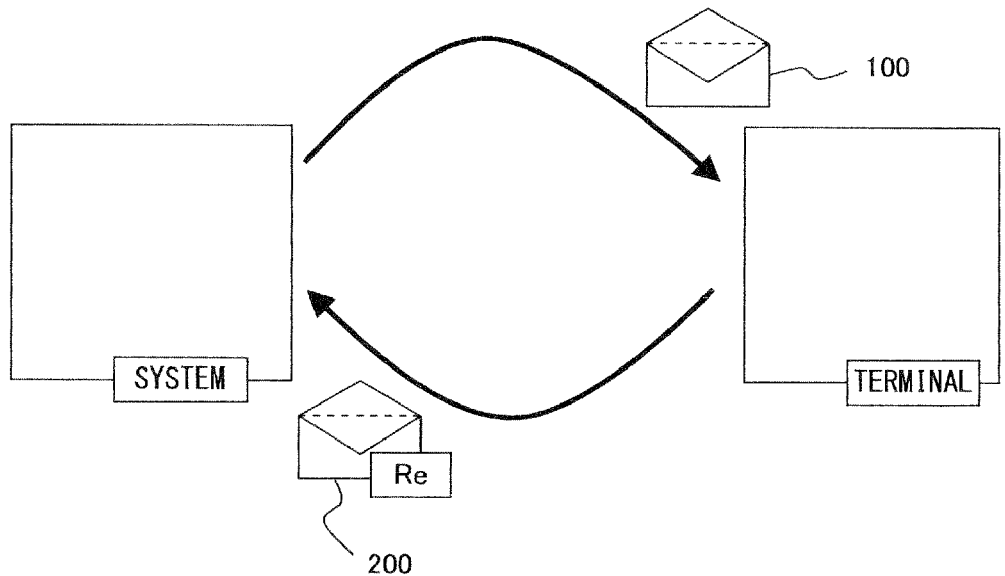
FIG. 3 is an explanatory view (2) of the outline of the operation of the microscope image taking system illustrated in FIG. 1.

Furthermore, when the system receives an e-mail answering the e-mail transmitted by the system itself, it can stop time-lapse photography. That is, as illustrated in FIG. 3, the user of the terminal that has received e-mail 100 from the system can issue an instruction to stop time-lapse photography only by performing the operation of transmitting e-mail 200 as an answer to the e-mail 100. In addition, the e-mail addressed to the microscope image taking system and transmitted from the terminal is temporarily stored in the mail server not illustrated in the attached drawings but existing in the communication network, and the microscope image taking system receives the e-mail addressed to the system when the CPU 44 is available. Therefore, an excess load of the CPU 44 can be protected during the communication with terminals.

The CPU 44 performs the control process described below to operate the microscope image taking system as described above.

Figure 4:
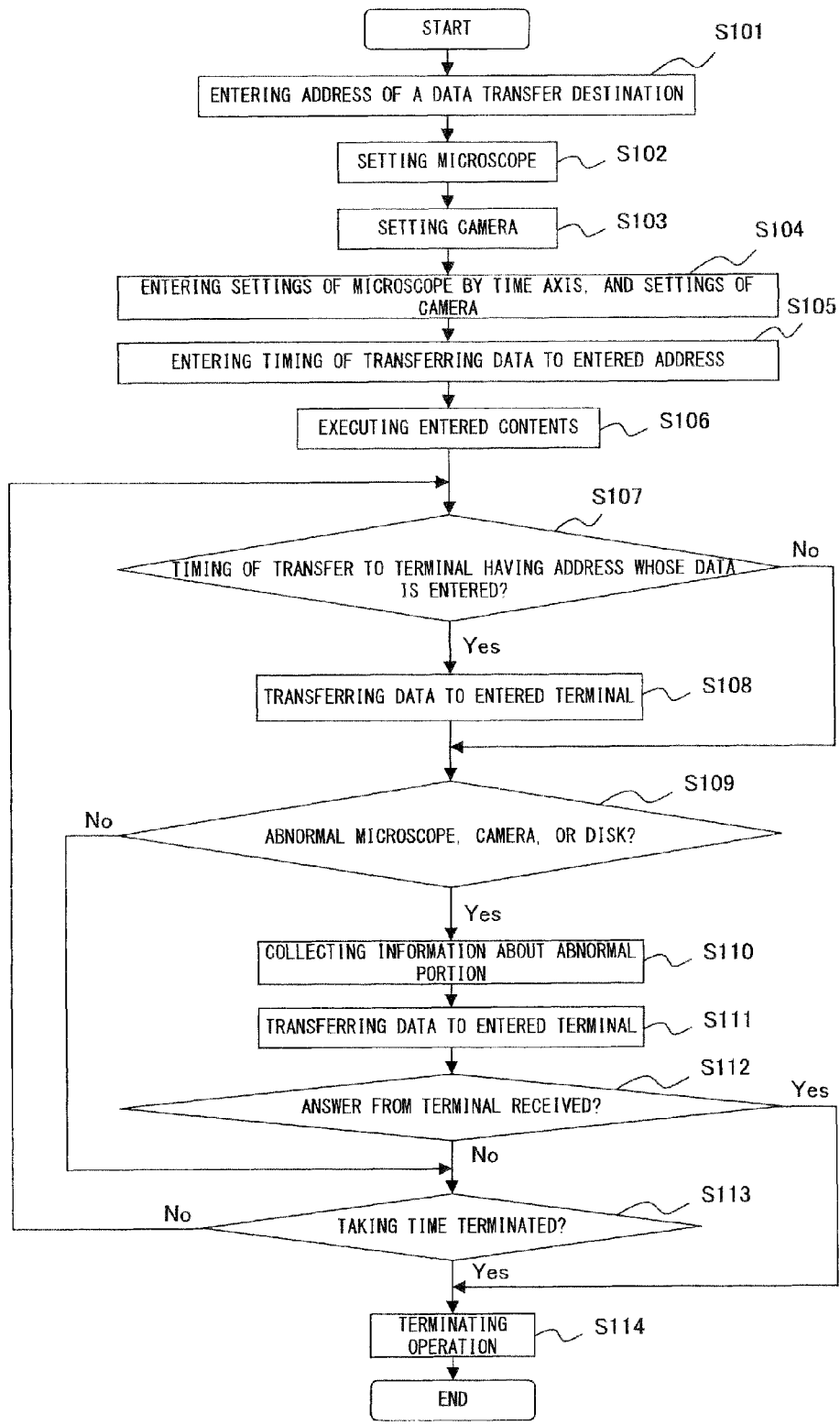
FIG. 4 is a flowchart of the process contents of the control process.

The process illustrated in FIG. 4 is described below. FIG. 4 is a flowchart of the process contents of the control process performed by the CPU 44. The CPU 44 realizes the control process by reading and executing a predetermined control program stored in advance in the disk 42 at a predetermined execute instruction issued by a user to the input device 50.

In FIG. 4, performed first in S101 is the process of entering the address designating on the communication network the terminal that performs a remote operation on the microscope image taking system.

In the present embodiment, since the communication of data between the microscope image taking system and the terminal is performed using e-mail, the e-mail address is entered as an address designating the terminal on the communication network. To attain this, the CPU 44 first controls the graphic control device 47 to display the address entry screen used for the settings as illustrated in FIG. 5 on the display device 60. Then, it acquires the name of a user (user name) of the terminal input by the user operating the input device 50 according to the display contents on the screen, and the information (address) about the e-mail address assigned to the user, and records them on the disk 42. On the basis of the correspondence in the same line on the table on the screen illustrated in FIG. 5, a user ID for identification is assigned to each user.

The CPU 44 also acquires other types of information from the input device 50, and performs the process of recording the information on the disk 42. The information acquired and recorded at this time can be a data format of an image data file to be attached to the e-mail, the resolution of an image displayed on the file, a data compression rate used when the image is converted into the image data, etc.

Performed next in S102 is the process of setting each electro-optical member of the microscope 10.

In this process, according to the sample to be observed and its observing method (speculum method), each electro-optical member of the microscope 10 is initialized. To perform the process, the CPU 44 first controls the graphic control device 47, and performs the process of displaying the GUI screen (microscope setting GUI) used for the initialization on the display device 60. Performed next is the process of acquiring the information input by the user operating the input device 50 on the basis of the display contents on the screen. Then, according to the acquired information, an instruction is issued to the microscope control device 20, and each electro-optical member of the microscope 10 is controlled such that the settings can be performed at the instruction of the user.

Next in S103, the process of setting the taking operation conditions of the camera 30 is performed.

In the process in S103, the CPU 44 first allows the camera control device to acquire the image data of the image currently being taken by the camera 30, transmits the acquired image data to the graphic control device 47, and displays the image represented by the image data on the display device 60. The process of acquiring the image data and displaying the image is performed at a predetermined interval (for example, 30 times per second) Thus, the observed image of a sample displayed on the display device 60 is called a live preview image and the like.

In addition, at this time, the CPU 44 controls the graphic control device 47, and displays the GUI screen (camera setting GUI) used in setting the taking operation conditions of the camera 30 on the display device 60. The CPU 44 also performs the process of acquiring from the input control device 46 the information input by the user observing the live preview image by operating the input device 50 on the basis of the display contents on the screen. Then, the CPU 44 performs the process of controlling the camera 30 such that the settings can be performed at the instruction of the user by transmitting the instruction to the camera control device 41 according to the acquired information.

Then, in S104, the setting entry process of the microscope 10 and the camera 30 depending on the time axis is performed in the time-lapse photography.

In this process, the setting entry of, for example, the taking time in the time-lapse photography, and the taking intervals and the number of taken photos is performed. In addition, the setting entry of switching the taking operation conditions of the camera 30 for an image size, exposing time, a gain, the presence/absence of binning, contrast, sharpness, etc. is performed as necessary. Furthermore, the setting entry of switching each electro-optical member of the microscope 10 is performed as necessary during each taking operation. In the setting entry, for example, a setting of reducing the damage to a sample caused by illumination by opening/closing an electric shutter in synchronization with the timing of the taking operation of the camera 30, and a setting of switching an optical cube provided with an optical member by driving an electric cube turret are entered.

In the process in S104, the CPU 44 controls the graphic control device 47 and performs the process of displaying the GUI screen (setting GUI) used for the setting entries on the display device 60. Then, it acquires the information input by a user operating the input device 50 on the basis of the display contents on the screen from the input control device 46, and records the information on the disk 42.

The examples illustrated in FIGS. 6A and 6B are described below. FIGS. 6A and 6B illustrate examples of a screen of a setting entry displayed on the display device 60 in the process in S104. FIG. 6A illustrates a setting entry for the microscope 10 and the camera 30, and FIG. 6B illustrates a setting entry for the time-lapse photography.

In FIG. 6A, the set items are "exposing time", a "gain", and "image size". The set items for the microscope 10 are the type of an "object lens" to be used, the type of an optical "cube" to be used, a "position", a "condenser" to be used, a "lamp" to be used, a "filter" to be used. An item of the "object lens" is provided for the drive control of an electric revolver. The item of the "cube" is provided for the drive control of an electric cube turret. The item of the "position" is provided for the drive control of the electric stage. The item of the "condenser" is provided for the drive control of an electric condenser. The item of the "lamp" is provided for the drive control of an illumination device. The item of the "filter" is provided for the drive control of an electric filter.

In FIG. 6B, items of a taking interval and a total number of taken images are provided as set items for the time-lapse photography.

It is also possible to display a plurality of setting GUIs illustrated in FIGS. 6A and 6B on the display device 60 to perform plural sets of setting entries so that each of the contents of the setting entries can be reproduced and taken on the microscope image taking system in a predetermined order.

Next, performed in S105 is the process of entering the timing of transferring data to the address entered in the process in S101. That is, in the present embodiment, performed is the process of entering the time interval (transmission interval) of the microscope image taking system transmitting the e-mail addressed to the terminal for transferring data to the terminal.

In the process in S105, the CPU 44 acquires from the input control device 46 and records, to the disk 42, the information about the time intervals input by a user operating the input device 50 on the basis of the display contents of the setting GUI.

Described below is the example illustrated in FIG. 7. FIG. 7 illustrates an example of a screen of a setting GUI displayed on the display device 60 in the process in S105. In the screen example, a transmission interval and a user ID for designation of a destination of e-mail are provided as setting entry items.

Next, in S106, the time-lapse photography is started on the basis of the set contents entered in the processes in S104 and S105.

In the process, the CPU 44 first controls the graphic control device 47 to display a time-lapse photography start button icon on the display device 60. Then, a process signal is temporarily stopped until the input control device 46 acquires the instruction information to press the time-lapse photography start button icon by a user operating the input device 50. When the CPU 44 detects that the input control device 46 has acquired the instruction information, it first reads the information recorded on the disk 42 by the processes in S104 and S105. Next, according to the information and the time information counted by a timer not illustrated in the attached drawings but built in the CPU 44 itself, it issues an instruction to the microscope control device 20 and the camera control device 41. At the instruction, the CPU 44 allows the microscope control device 20 and the camera control device 41 to control the switching of the electro-optical member of the microscope 10, the switch setting of the taking operation conditions of the camera 30, and the taking operation of an observed image of a sample for the camera 30.

Next, in S107, it is determined whether or not the timing of transferring data to a terminal designated by an entered address has come. That is, according to the present embodiment, the CPU 44 detects using the above-mentioned timer the lapse of time corresponding to the time intervals entered in the process in S105, and determines whether or riot the timing of transmitting e-mail addressed to the terminal has come. If it is determined that the timing has come (YES as a determination result), control is passed to S108. If it is determined that the timing has not come (NO as a determination result), control is passed to S109.

In S108, data is transferred to a terminal whose address has been entered. That is, in the present embodiment, the CPU 44 first reads an address specified as a destination in the process in S105 from among the e-mail addresses recorded on the disk 42 in the process in S101, and e-mail having the address as a destination is generated. Next, the communication control device 48 is controlled to transmit the generated e-mail to a communication network.

The CPU 44 includes in the generated e-mail, for example, the image data of an observed image taken by the camera 30 approximately at the time of the generation and recorded on the disk 42. However, the image data is converted into the image size, the data type, and the data compression rate of the data recorded on the disk 42 in the process in S101, and then included in the e-mail. The compressing process of the image data is performed in an existing method (for example, the JPEG system, the JPEG2000 system, etc.). The image data can be attached to the e-mail, and an image can also be embedded in the text of the e-mail.

The CPU 44 also includes unique identification information about the microscope image taking system as header information in the generated e-mail.

The CPU 44 includes as the text of the generated e-mail the setting information about an electro-optical member of the microscope 10 obtained when the image is taken and the information about the taking operation conditions of the camera 30 in the text information.

Next, in S109, it is determined whether or not there has occurred an abnormality on the microscope 10, the camera 30, or the disk 42 storing data.

In the microscope 10, the microscope control device 20 and the camera control device 41 output an error code corresponding to a detected abnormal condition to the computer 40.

The microscope control device 20 outputs an error code corresponding to each of the following conditions to the computer 40.

The microscope control device 20 cannot detect a switch of the object lens while the microscope control device 20 is drive-controlling an electric revolver.

The microscope control device 20 cannot detect the turn-on of an illumination while the microscope control device 20 is turn-on controlling the illumination.

The microscope control device 20 cannot detect a change of the position of an electric stage while the microscope control device 20 is drive-controlling the electric stage.

The microscope control device 20 cannot detect the opening/closing of a shutter while the microscope control device 20 is controlling the opening/closing of the shutter.

The camera control device 41 outputs to the CPU 44 an error code corresponding to each condition in each of the following conditions.

In the camera 30, the camera control device 41 acquires the information about the internal temperature of the camera 30 exceeding an allowable range using a temperature sensor not shown in the attached drawings but provided for the camera 30.

The camera control device 41 cannot detect a setting change of the exposing time of the camera 30 although the camera control device 41 controls a setting change of the exposing time for the camera 30.

The CPU 44 can detect an abnormality of the microscope 10 or the camera 30 by receiving the above-mentioned error code from the microscope control device 20 or the camera control device 41. The CPU 44 can detect the abnormality of the disk 42 by receiving an error code output by the disk control device 43.

In the determining process in S109, control is passed to S110 when it is determined that an abnormality has occurred (when the determination result is YES), and control is passed to S113 when it is determined that no abnormality has occurred (when the determination result is NO).

In S110, the information about a portion where an abnormality has occurred is collected. That is, in the present embodiment, the CPU 44 collects the error codes received from the microscope control device 20, the camera control device 41, or the disk control device 43, and collectively and temporarily stores the codes in the memory 45.

In S111, the data indicating the collection result in the process in S110 is transferred to a terminal whose address has been entered. That is, in the present embodiment, the CPU 44 first reads an error code stored in the memory 45, and generates e-mail by including the information about the error code in the text. In the e-mail, an address specified as a destination in the process in S105 is read from among the e-mail addresses recorded on the disk 42 in the process in S101, and the address is defined as the destination of the e-nail. Then, the communication control device 48 is controlled to transmit the generated e-mail to a communication network.

Figure 8:
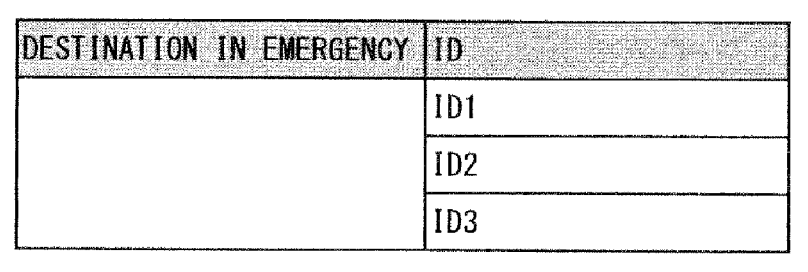

It is also possible to make the destination of the e-mail for notification of the occurrence of an abnormality different from the destination of the e-mail to which a time-lapse photo image is attached. That is, as illustrated in FIG. 8, a user ID indicating the destination of the e-mail in an emergency (when an abnormality has occurred) is entered on the disk 42. Then, in the process in S111, an address specified as a destination in a emergency in the entry contents is read from among the e-mail addresses recorded on the disk 42, and the address is defined as a destination of the e-mail. Then, the CPU 44 controls the communication control device 48 and transmits the generated e-mail to the communication network.

The CPU 44 includes in the generated e-mail unique identification information about the microscope image taking system as header information.

The processes in S109 through S111 are described later practically.

In S112, it is determined whether or not e-mail as an answer to the e-mail transmitted by the microscope image taking system has been received.

In this process, the CPU 44 controls the communication control device 48 to transmit an e-mail distribution request to the microscope image taking system to the e-mail server not illustrated in the attached drawings on a communication network. Then, it is determined whether or not the e-mail received from the e-mail server at the distribution request is an answer to the e-mail transmitted by the microscope image taking system. The determination is made on the basis of the presence/absence of unique identification information about the microscope image taking system in the header information of the e-mail, and the source of the e-mail. If it is determined that answering e-mail has been received, the determination result in S112 is assumed as YES, and control is passed to S114. On the other hand, if it is determined that the answering e-mail has not been received, the determination result in S112 is assumed as NO, and control is passed to S113.

Next, in S113, it is determined whether or not the time-lapse photography has reached its stop time. That is, in the present embodiment, the CPU 44 determines on the basis of the counting operation by the timer whether or not the elapsed time from the start of the time-lapse photography has reached the taking time entered in the setting entry process in S104. If it is determined that the time-lapse photography stop time has been reached (the determination result is YES), control is passed to S114. On the other hand, if it is determined that the time-lapse photography stop time has not been reached (the determination result is NO), control is returned to S107, and the above-mentioned processes are repeated.

In S114, the process of ending the performance of the time-lapse photography started in the process in S106 is performed, and then the control process illustrated in FIG. 4 is terminated.

By the CPU 44 performing the above-mentioned processes, the microscope image taking system illustrated in FIG. 1 operates as described above.

Figure 9:
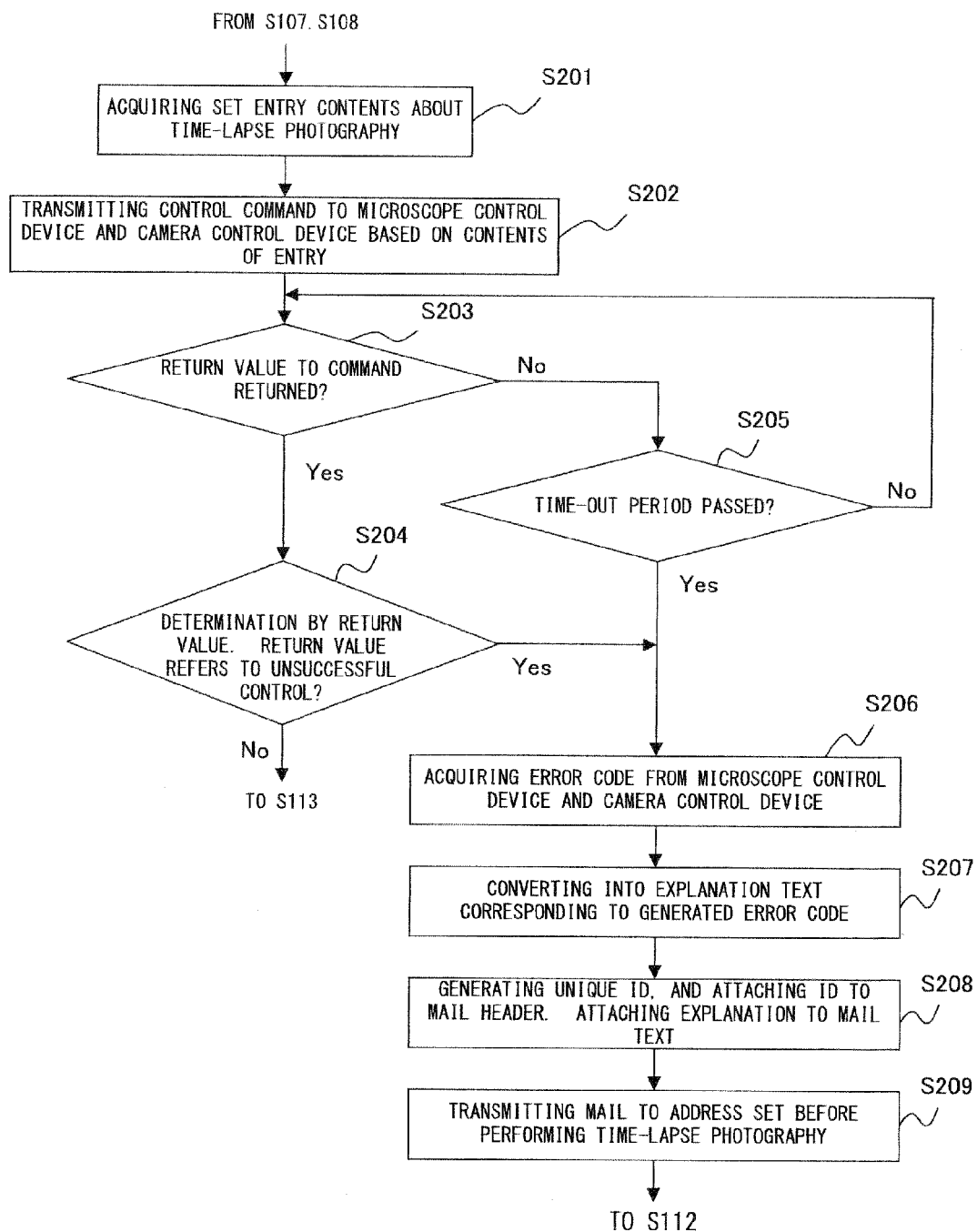
FIG. 9 is a flowchart of the process contents of an abnormality notifying process.

Described next is the process illustrated in FIG. 9. FIG. 9 is a flowchart of the process contents of an abnormality notifying process performed by the CPU 44. The process is more practically illustrated on the process performed in S109 through S111 illustrated in FIG. 4.

The process in S201 is performed after the process in S107 in the control process illustrated in FIG. 4 or when the determination result in the process in S107 in the control process is NO. In S201, the contents set and entered in the processes in S104 and S105 in the control process are read from the disk 42 and acquired.

Next, in S202, a control command to realize the settings of the contents obtained in the process in S201 is transmitted to the microscope control device 20 and the camera control device 41. When the controlling operation corresponding to the control command has been successfully performed, the microscope control device 20 and the camera control device 41 returns a value indicating the successful control (for example, "1") as a return value to the CPU 44. On the other hand, if the controlling operation corresponding to the control command has not successfully performed, a value indicating an unsuccessful control (for example, "0") is returned as a return value to the CPU 44.

Each determining process from S203 to S205 after S202 corresponds to the determining process in S109 in FIG. 4.

First, in S203, it is determined whether or not a return value for the control command transmitted in the process in S202 has been acquired. If it is determined that the return value has been acquired (the determination result is YES), control is passed to S204. If it is determined that the return value has not been acquired (the determination result is NO), control is passed to S205.

In S204, it is determined whether or not the acquired return value is a value indicating unsuccessful control. If it is determined that the return value indicates unsuccessful control (the determination result is YES), control is passed to S206. On the other hand, if it is determined that the return value indicates successful control (the determination result is NO), the abnormality notifying process terminates, and control is passed to S113 in FIG. 4.

In S205, it is determined on the basis of a count result by a timer built in the CPU 44 whether or not the elapsed time from the transmission of a control command in the process in S202 has passed a predetermined time-out period. If it is determined that the time-out period has passed (the determination result is YES), control is passed to S206. On the other hand, if it is determined that the time-out period has not been passed (the determination result is NO), control is returned to S203, and the above-mentioned determining process is repeated.

The next process in S206 corresponds to the process in S110 in FIG. 4. That is, in S206, an error code indicating the details of an abnormality and autonomously transmitted from the microscope control device 20 and the camera control device 41 or transmitted at a request of the CPU 44 is acquired.

The next processes in the S207 through S209 correspond to the process in S111 in FIG. 4.

First, in S207, an error code is converted into corresponding explanation text. The disk 42 stores a document data file associating the error code with document data as the explanation text. The CPU 44 refers to the document data file and converts the error code into explanation text on the basis of the contents.

Next, in S208, unique identification information (ID) about the microscope image taking system is generated, the ID is included in header information, and e-mail including the explanation text obtained in the process in S207 is generated.

Next, in S209, an address specified as a destination in the process in S105 (or the address specified as a destination in an emergency on the basis of the entry contents of the screen illustrated in FIG. 8) is read from among the e-mail addresses recorded on the disk 42 in the process in S101. Then, the communication control device 48 is controlled using the address as the destination of the e-mail, and the generated e-mail is transmitted to the communication network. Afterwards, the abnormality notifying process is terminated, and control is passed to S112 in FIG. 4.

By the CPU 44 performing the above-mentioned abnormality notifying process, e-mail for notifying a user set as a notification destination is transmitted to notify the user of the occurrence of an abnormality in the system during the performance of the time-lapse photography by the microscope image taking system illustrated in FIG. 1.

In the control process illustrated in FIG. 4, the e-mail including the time-lapse photo image addressed to the terminal is transmitted to the communication network at the predetermined time intervals. Furthermore, the e-mail can be transmitted when a change exceeding a predetermined threshold occurs in an observed image of the sample taken by the camera 30.

Figure 10:
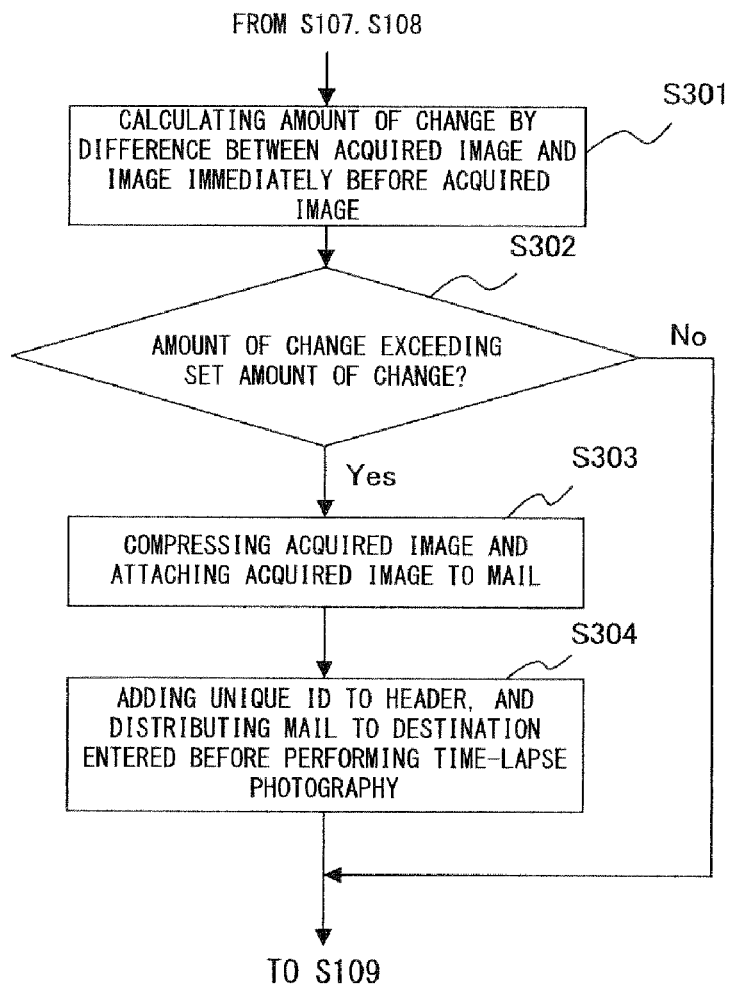
FIG. 10 is a flowchart of the process contents of a mail transmitting process.

The flowchart illustrated in FIG. 10 is described below. FIG. 10 is a flowchart of the process contents of the mail transmitting process performed by the CPU 44 to perform the operation in the microscope image taking system illustrated in FIG. 1. The process is performed, for example, between the processes in S107 and S108 in the control process illustrated in FIG. 4 and the process in S109.

In FIG. 10, first in S301, an amount of change of an observed image is calculated. In this process, a difference is calculated between an observed image recorded on the disk 42 from the image data taken by the camera 30 immediately before generating the email and an observed image recorded on the disk 42 from the image data taken by the camera 30 immediately before taking the aforementioned image data (for example, the difference in brightness for each pixel configuring an image). The difference is defined as a calculation result of the amount of change of an observed image.

Next, in S302, it is determined whether or not the amount of change exceeds a predetermined threshold. If it is determined that the amount of change exceeds the threshold (the determination result is YES), control is passed to S303. On the other hand, if it is determined that the amount of change has not exceeded the threshold (the determination result is NO), then the mail transmitting process terminates, and control is passed to S109 in FIG. 4.

Figure 11:
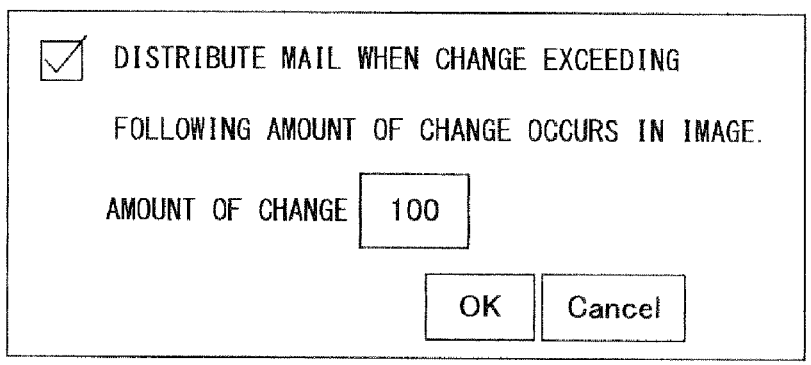
FIG. 11 illustrates an example of a change amount threshold setting screen.

The threshold can be threshold information obtained by the CPU 44 recording the user input threshold information on the disk 42 before starting the control process illustrated in FIG. 4. Therefore, the CPU 44 displays the change amount threshold setting screen as illustrated in FIG. 11 on the display device 60 and acquires, from the input control device 46, the threshold information input by the user after operating the input device 50 on the basis of the display contents on the screen.

Next, in S303, e-mail is generated, and the image data of the observed image (to be processed in S301) recorded on the disk 42 after taken by the camera 30 immediately before the generation time is included. In this process, the image data is first converted into the image size, the data type, and the data compression rate recorded on the disk 42 in the process in S101, and then included. In the next process in S304, the unique identification information about the microscope image taking system is included as header information in the generated e-mail. Next, an address specified as a destination in the process in S105 is read from among the e-mail addresses recorded on the disk 42 in the process in S101 illustrated in FIG. 4. Then, the bus communication control device 48 is controlled to transmit the generated e-mail to the communication network. Afterwards, the mail transmitting process is terminated, and control is passed to S109 illustrated in FIG. 4.

By the CPU 44 performing the above-mentioned mail transmitting process, e-mail addressed to the terminal including the image data of the observed image is transmitted when a change exceeding a predetermined threshold occurs on the observed image of a sample taken by the camera 30. Therefore, by receiving the e-mail, a user of the terminal can recognize a big change occurring on an observed image without considering the taking time intervals set for the time-lapse photography although located in a position physically remote from the microscope image taking system.

As described above, in the microscope image taking system illustrated in FIG. 1, the status of the sample observation in the time-lapse photography can be informed although an observer does not attend test equipment. In addition, using e-mail in communications with a terminal, a schedule of the time-lapse photography can be stopped in a low load state, thereby successfully providing a secure system.

The embodiments of the present invention have been described above, but the present invention is not limited to each of the above-mentioned embodiments, and various improvements and amendments can be performed within the scope of the gist of the present invention.

What is claimed is:

1. A system for taking a microscope image, comprising:
a camera which takes an observed image of a sample obtained by a microscope;
a CPU which controls the camera to take the observed image repeatedly at predetermined taking time intervals;
wherein the CPU records in a storage device image data representing the observed image taken by the camera;
wherein the CPU detects an occurrence of an abnormality in at least one of the microscope, the camera, and the storage device;
wherein the CPU generates an e-mail containing the image data and information about settings of at least one of the microscope and the camera at a time of taking the observed image represented by the image data using an e-mail address registered in advance as a destination; and
wherein the system further comprises a communication device which transmits the e-mail to a communication network;
wherein the CPU generates the e-mail at predetermined generating intervals, and the e-mail includes only one image composed of image data representing the observed image taken by the camera immediately before generating the e-mail;
wherein the CPU transmits a control command to at least one of a microscope control device controlling the microscope and a camera control device controlling the camera, and the CPU detects the occurrence of an abnormality when the CPU determines that a return value for the control command is not returned after passage of a predetermined time-out period;
wherein the CPU generates an abnormality occurrence notification mail as an e-mail including information indicating the occurrence of the abnormality when the CPU detects the occurrence of the abnormality; and
wherein the communication device transmits the e-mail each time the CPU generates the e-mail, including when the CPU generates the e-mail at the predetermined generating intervals, and when the CPU generates an abnormality occurrence notification mail as the e-mail.

2. The system according to claim 1,
wherein the communication device transmits the e-mail to the communication network and receives a system-addressed e-mail addressed to the microscope image taking system from an e-mail server on the communication network; and
wherein the CPU controls the camera to stop repetition of taking the observed image when the system-addressed e-mail received by the communication device is an answer to the e-mail generated by the CPU.

3. The system according to claim 2, wherein the CPU includes identification information designating the microscope image taking system in header information in the e-mail; and
wherein the CPU determines that the system-addressed mail is the answer when the identification information is included in the system-addressed e-mail received by the communication device.

4. The system according to claim 1, wherein the CPU makes a destination of the abnormality occurrence notification mail different from a destination of the e-mail including the image data.

5. The system according to claim 1, wherein:
the CPU compares an amount of change between one observed image taken by the camera immediately before generating the email and another observed image taken by the camera immediately before said one observed image;
the CPU generates the e-mail including image data representing said one observed image taken by the camera immediately before generating the email when the amount of change between said one observed image and said another observed image taken immediately before said one observed image is larger than a predetermined threshold; and the communication device transmits the e-mail each time the CPU generates the e-mail.

6. A method of transmitting a microscope image, comprising:

recording, in a storage device, image data representing an observed image of a sample obtained by a microscope and captured by a camera which has been controlled to take the observed image repeatedly at predetermined taking time intervals;

detecting an occurrence of an abnormality in at least one of the microscope, the camera, and the storage device;

generating an e-mail containing the image data and information about settings of at least one of the microscope and the camera at a time of taking the observed image represented by the image data using an e-mail address registered in advance as a destination; and transmitting the e-mail to a communication network;

wherein the e-mail is generated at predetermined generating intervals, and the e-mail includes only one image composed of image data representing the observed image taken by the camera immediately before generating the e-mail;

wherein a control command is transmitted to at least one of a microscope control device controlling the microscope and a camera control device controlling the camera, and the occurrence of an abnormality is detected when it is determined that a return value for the control command is not returned after passage of a predetermined time-out period;

wherein an abnormality occurrence notification mail is generated as an e-mail including information indicating the occurrence of the abnormality when the occurrence of the abnormality is detected; and wherein the e-mail is transmitted each time the e-mail is generated, including when the e-mail is generated at the predetermined generating intervals, and when the abnormality occurrence notification mail is generated as the e-mail.

7. A non-transitory computer-readable recording medium having stored thereon a program which controls a computer to perform a process of transmitting a microscope image, the process comprising:

recording, in a storage device, image data representing an observed image of a sample obtained by a microscope and captured by a camera which has been controlled to take the observed image repeatedly at predetermined taking time intervals;

detecting an occurrence of an abnormality in at least one of the microscope, the camera, and the storage device;

generating an e-mail containing the image data and information about settings of at least one of the microscope and the camera at a time of taking the observed image represented by the image data using an e-mail address registered in advance as a destination; and transmitting the e-mail to a communication network;

wherein the e-mail is generated at predetermined generating intervals, and the e-mail includes only one image composed of image data representing the observed image taken by the camera immediately before generating the e-mail;

wherein a control command is transmitted to at least one of a microscope control device controlling the microscope and a camera control device controlling the camera, and the occurrence of an abnormality is detected when it is determined that a return value for the control command is not returned after passage of a predetermined time-out period;

wherein an abnormality occurrence notification mail is generated as an e-mail including information indicating the occurrence of the abnormality when the occurrence of the abnormality is detected; and wherein the e-mail is transmitted each time the e-mail is generated, including when the e-mail is generated at the predetermined generating intervals, and when the abnormality occurrence notification mail is generated as the e-mail.

* * * * *